(12) United States Patent
Blair et al.

(10) Patent No.: US 6,698,194 B2
(45) Date of Patent: Mar. 2, 2004

(54) TWO-STROKE INTERNAL COMBUSTION ENGINE

(75) Inventors: Gordon P. Blair, Belfast (CH); Reine Gustafsson, Våggeryd (SE)

(73) Assignee: Aktiebolaget Electrolux, Stockholm (SE)

( * ) Notice: Subject to any disclaimer, the term of this patent is extended or adjusted under 35 U.S.C. 154(b) by 0 days.

(21) Appl. No.: 10/102,756

(22) Filed: Mar. 21, 2002

(65) Prior Publication Data

US 2002/0152747 A1 Oct. 24, 2002

Related U.S. Application Data

(63) Continuation of application No. PCT/SE00/01844, filed on Sep. 22, 2000.

(51) Int. Cl.$^7$ ................................................. F02B 27/02
(52) U.S. Cl. ......................................... 60/314; 60/312
(58) Field of Search .......................... 60/312, 314, 602; 181/240, 269, 272

(56) References Cited

U.S. PATENT DOCUMENTS

| | | | | |
|---|---|---|---|---|
| 1,804,321 A | * | 5/1931 | Crowe ........................... | 60/314 |
| 2,542,756 A | * | 2/1951 | Draminsky ................... | 60/314 |
| 3,064,417 A | * | 11/1962 | Tryhorn et al. ............... | 60/314 |
| 3,612,217 A | | 10/1971 | Heath et al. | |
| 4,038,820 A | * | 8/1977 | Tsukamoto ................... | 60/314 |
| 4,499,732 A | * | 2/1985 | Szczupak et al. ............. | 60/602 |
| 4,545,200 A | * | 10/1985 | Oike et al. .................... | 60/314 |
| 4,558,566 A | * | 12/1985 | Shirakura ..................... | 60/314 |
| 5,012,642 A | * | 5/1991 | Laimböck ..................... | 60/314 |
| 5,014,816 A | | 5/1991 | Dear et al. | |
| 5,245,824 A | * | 9/1993 | Nouis ........................... | 60/314 |

FOREIGN PATENT DOCUMENTS

| | | | |
|---|---|---|---|
| JP | 58-202320 | * | 11/1983 |
| JP | 61-14424 A | | 1/1986 |
| SE | 510 530 C2 | | 5/1999 |
| WO | WO 97/17531 | | 5/1997 |

* cited by examiner

*Primary Examiner*—Thomas Denion
*Assistant Examiner*—Tu M. Nguyen
(74) *Attorney, Agent, or Firm*—Pearne & Gordon LLP

(57) ABSTRACT

A two-stroke internal combustion engine (1) is provided with a muffler device (2). In one example, the engine (1) is intended for a working tool, such as a chain saw or a trimmer. A pipe (3), which either is straight or bent, and having an adapted or tuned length and a closed outer end (4), is arranged in connection to the engine's exhaust port (5) as well as an outlet (6), which leads the exhaust gases to the surrounding air. By this arrangement of the pipe (3) and the outlet (6) the scavenging losses are reduced and thereby the specific fuel consumption is reduced and cleaner exhaust gases are achieved.

10 Claims, 2 Drawing Sheets

TWO-STROKE INTERNAL COMBUSTION ENGINE

This application is a Continuation of international application PCT/SE00/01844 filed on Sep. 22, 2000.

TECHNICAL FIELD

The subject invention relates to an internal combustion engine of two-stroke type, mainly intended for a working tool, preferably a chain saw or a trimmer, and provided with a muffler device.

BACKGROUND OF THE INVENTION

For working tools run by internal combustion engines generally two-stroke engines are used, mainly due to their low weight and simple design. Also, the crankcase scavenging enables a lubrication system independent of position, in which the engine is lubricated by oil that is added to the air/fuel mixture scavenged through the crankcase. The all-position lubrication system is necessary for typical working tools, e.g., chain saws, since they are to be used in a lot of different working positions.

Two-stroke engines for mopeds and motorcycles generally have a so-called tuned exhaust system. Reflected pressure pulses from the exhaust system will press scavenging gases back into the cylinder so that the engine's scavenging losses are reduced. In total this means that both the power output and fuel consumption can be improved in comparison with a non-tuned exhaust system. However, in order to function well, the tuned exhaust system requires large lengths of pipe as well as large cross-section areas in the exhaust duct. Such a muffler for a chain saw would be at least half a meter long and consist of a first conically expanding duct section by approximately 8 degrees, and a second conically narrowing section by approximately 12 degrees. Between these conical parts there should be located a straight part having a diameter, or actually a cross-section area, which is many times larger than the exhaust port. If, for example, the exhaust port would have a diameter of 30 mm, then the straight part would have a diameter of approximately 60–100 mm and approximately a 10 times larger cross-section area. Subsequent to the pipe, an absorption muffler should be connected in order suppress sound to a reasonable level.

As mentioned above, such a tuned exhaust system is based on reflected pressure pulses as well as a low total pressure drop. Regarding working tools, it has been determined that such a tuned exhaust system will be far too large and heavy, even if the pipe system is provided with a lot of curves. This is due to the large cross-section areas. A working tool must be very lightweight, compact and handy in order to serve its purpose. Consequently, tuned exhaust systems are normally not used for working tools. Instead they have lightweight and compact mufflers in which the sound mainly is damped by throttling in the muffler. A larger cylinder volume is used to reach the preferable effect. Owing to the fact that there are great differences between the layout of two-stroke engines with tuned exhaust systems and without tuned exhaust systems, it is difficult to transfer experiences from one field to the other.

A well-known problem of two-stroke engines is their relatively high fuel consumption caused by high-scavenging losses, i.e., scavenging gases which flow straight out into the exhaust system. This also results in high emissions, especially of hydrocarbons. As mentioned above, the difficulties to overcome this problem are especially big for two-stroke engines with lightweight and compact mufflers, i.e., with non-tuned exhaust systems. The high emission of hydrocarbons also results in certain problems when using a muffler with catalytic conversion. For example, the very high energy content of the exhaust gases leads to a very high heat generation in the catalytic converter as well as in the surrounding muffler. This high extent of heat generation could mean that the conversion ratio in the catalytic converter must be kept down. Consequently, the high scavenging losses increase the fuel consumption at the same time as they complicate a co-operation with an exhaust catalytic converter.

SUMMARY OF THE INVENTION

The purpose of the subject invention is to substantially reduce the above outlined problems for a two-stroke internal combustion engine that is provided with a silencing device.

The above-mentioned purpose is achieved in a device in accordance with the invention, having the characteristics appearing from the appended claims.

The two-stroke internal combustion engine in accordance with the invention is thus essentially characterized in that a pipe, which is either straight or bent, and having an adapted or tuned length and a closed outer end, is arranged in connection to a cylinder exhaust port of the engine, as well as an outlet, which lead the exhaust gases to the surrounding air. When the exhaust port is opened a powerful pressure pulse is created which runs into the pipe and is reflected by its closed outer end. If the pipe is given a correctly tuned length for a given rotational speed, for example maximum power rpm, the reflecting pressure pulse from the pipe will increase the exhaust pressure outside the exhaust port before it will be closed, so that the pressure becomes higher than the pressure inside the cylinder. Thereby further scavenging gases are prevented to flow out and some of the scavenging gases could even be pressed back into the cylinder. Therefore the scavenging losses are reduced and the engine's power can be increased and its specific fuel consumption be reduced.

The exhaust emissions, especially of hydrocarbons, will be reduced substantially, with the result that also the heat strain on an eventual following exhaust catalyser will be reduced, so that its co-operation with the engine will be simplified.

Although the invention primarily is intended for an engine for a working tool the invention can be used for other kind of motor applications.

Further characteristics and advantages of the invention will become more apparent from the detailed description of preferred embodiments and with support of the drawing figures.

BRIEF DESCRIPTION OF THE DRAWINGS

The invention will be described in closer detail in the following by way of various embodiments thereof with reference to the accompanying drawing figures, in which the same numeral references in the different figures denote corresponding parts.

DESCRIPTION OF EXAMPLE EMBODIMENTS

Figure 1:
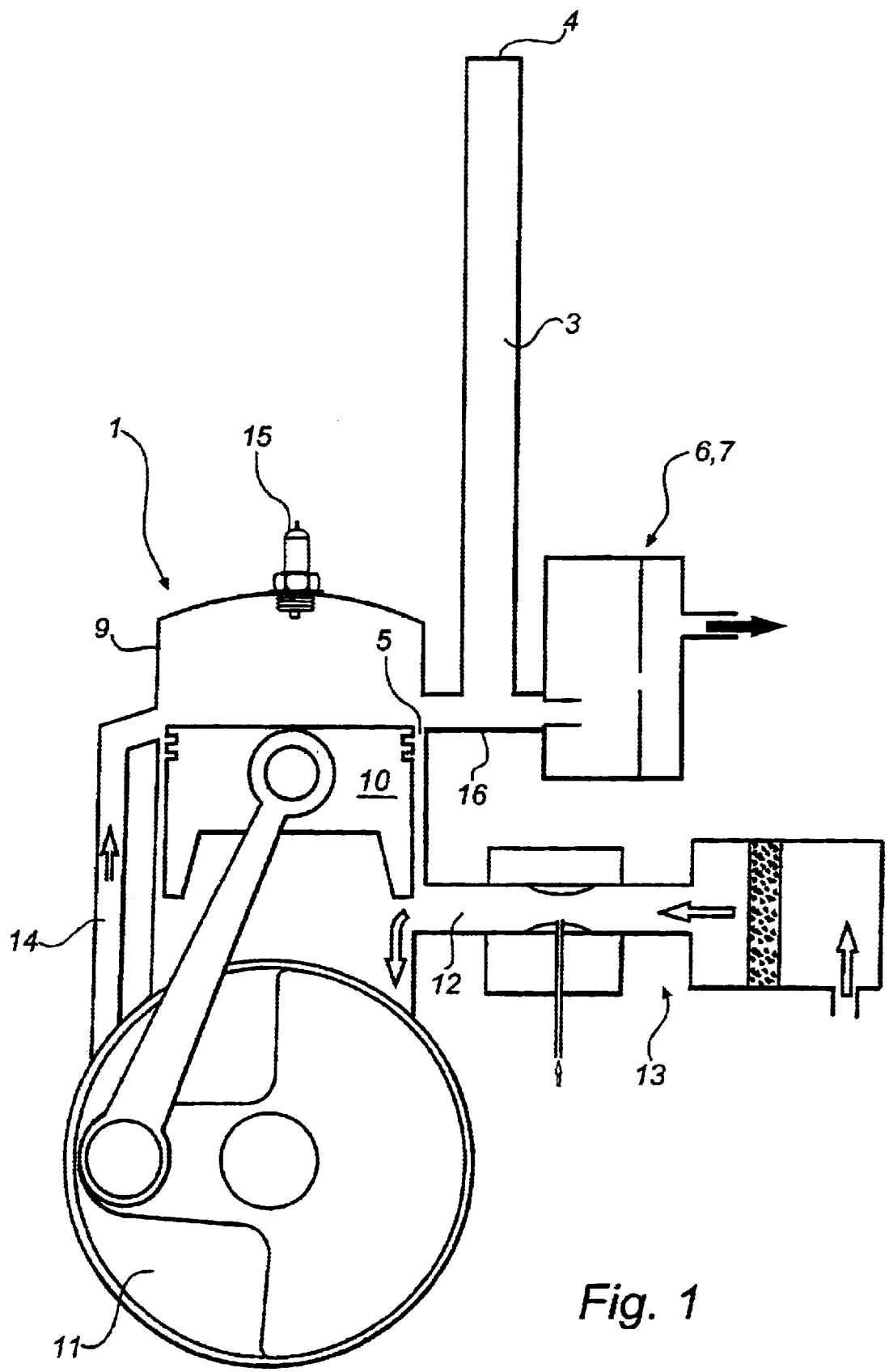
FIG. 1 illustrates schematically in cross-section an internal combustion engine of two-stroke type in accordance with the invention. It shows a muffler device that comprises a pipe and an outlet according to the invention. The outlet takes place through a conventional muffler.

In the schematic FIG. 1 numeral reference 1 designates an internal combustion engine of two-stroke type. It has a cylinder 9 with a piston 10, a crankcase 11, an inlet 12 with a fuel supply device, such as a carburetor 13, and furthermore scavenging ducts 14 and a spark plug 15. All this is conventional and will therefore not be described in closer detail. An exhaust pipe 16 connects to the engine's exhaust port 5 at its inner end and at its outer end it connects to a muffler 7. What is characteristic is that a pipe 3 with an adapted or tuned length and a closed outer end 4 is arranged in connection to the engine's exhaust port 5. Since the outer end 4 is closed exhaust gases cannot flow through the pipe 3. Instead they will flow out through an outlet 6, which is arranged via the conventional muffler 7.

Figure 2:
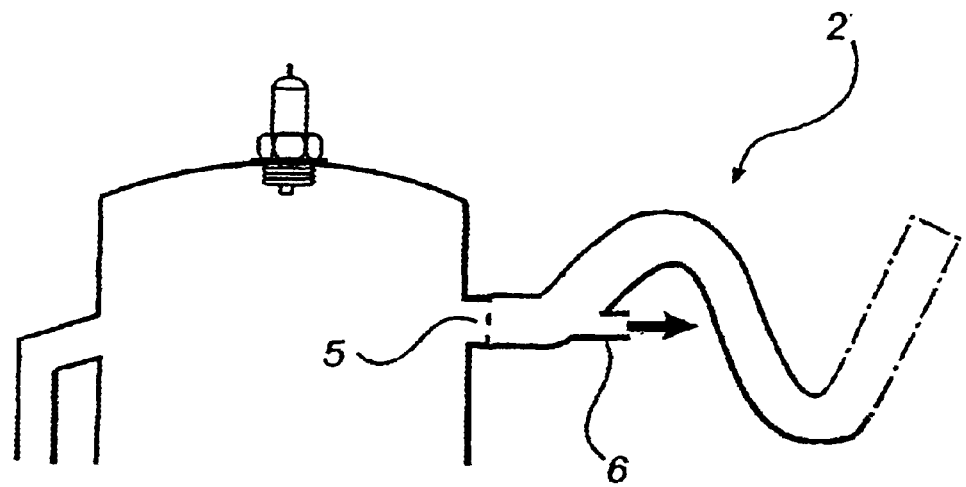
FIG. 2 shows a cross-sectional view of the upper part of the engine according to FIG. 1 but equipped with a somewhat different muffler device only consisting of a pipe and an outlet. Dash-dotted lines show those parts of the pipe that are lying above the plane of the paper.
Figure 3:
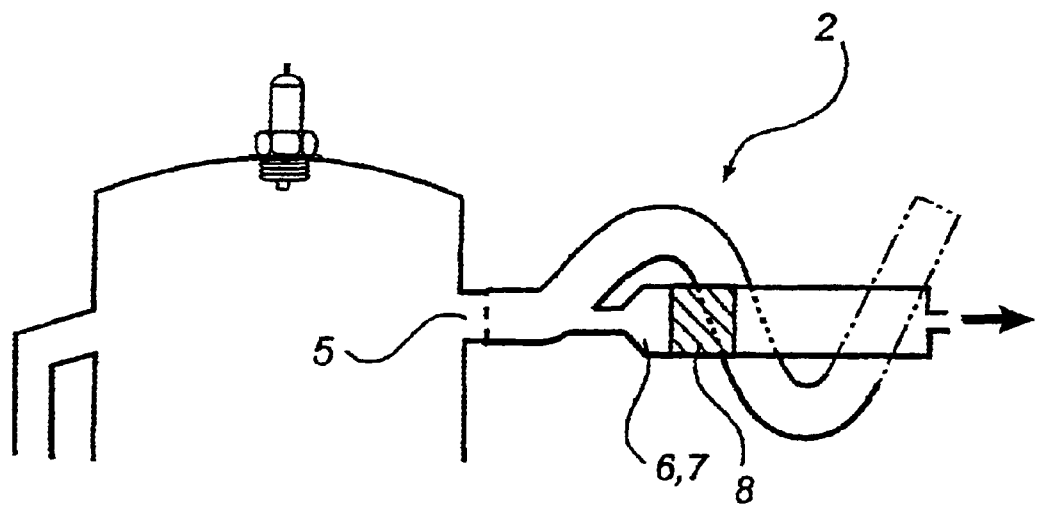
FIG. 3 shows a third embodiment of the muffler device, where the outlet takes place through a muffler with catalytic converter.

The outlet 6 can also contain a catalytic converter 8, which is shown in FIG. 3, or could be just an outlet into the air without any surrounding muffler, as shown in FIG. 2. The pipe could be arranged so that it connects directly to the exhaust port 5 without any intermediate part, as shown in the FIGS. 2 and 3. However, there can also be an exhaust pipe 16 or similar, as shown in FIG. 1.

As part of the function, the pipe 3 and the outlet 6 are arranged in connection to the engine's exhaust port 5. Hereby a powerful reflected pressure pulse is created in the pipe. The pressure wave that is created when the exhaust port is opened will travel to and fro in the pipe. With an correctly tuned length of the pipe, the pressure wave will, at a suitable rotational speed, turn back to the exhaust port exactly before it is closed and will hold back the outflow and even push back scavenging gases, i.e., air/fuel mixture, into the cylinder. The arrangement can be regarded as a three-legged intersection created in connection to the engine's exhaust port 5, with one branch to the port, one branch out to the pipe 3 and one branch through the outlet 6. The angles between the branches can be varied very much, e.g., the pipe can be located straight out from the port at an angle of 180°, or crosswise, i.e., at an angle of 90°. Consequently, when calculating the length of the pipe also the distance from the exhaust port to the mouth of the pipe must be considered. If this part should have another cross-section area than the pipe, then these parameters should be included in the calculation for the co-operating oscillation pipe. Also the length of the outlet 6 can affect the oscillation somewhat, and this can also be counted as a participant in the total oscillation. The outlet can also consist of several following parts that, to some extent, will affect the oscillation in the pipe.

The outlet 6 shall have a smaller cross-section area than the pipe 3. Preferably, the cross-section area of the outlet 6 is 0.1–0.7 times the cross-section area of the pipe 3 in order to achieve a satisfactory pressure pulse into the pipe 3. The outlet 6 can be arranged as a cavity or as a tube, which connects directly to the ambient atmosphere or to a muffler. The pipe 3 will change the conditions of the flow so that a cavity or a tube with a smaller cross-section area can be used without increasing the pressure fall over the muffler device. One can say that the pipe 3 has a buffer function that on the one hand changes the exhaust flow over the time period and on the other hand decreases the outflow of the scavenging gases. It is advantageous if the smallest cross-section area in the outlet 6 is located early in the outlet. Preferably the three throttlings in the outlet 6 as shown in FIG. 1 should be of approximately the same size. It is also important for the function that the outlet 6 is located adjacent the exhaust port 5. Preferably the outlet 6 is located at a distance from the exhaust port 5 that is less than half the length of the pipe 3, and preferably less than a quarter of its length. By a location close to the exhaust port 5 there is less risk that the returning pressure pulse will be attenuated before it reaches the exhaust port. It is also an advantage that any exhaust flow in the pipe 3 will be reduced to a part of the pipe closest to the exhaust port.

Preferably the pipe 3 has an essentially constant cross-section area along its entire length. However, it could also have some local change of the area, for example a conical section, over its length, or have a slightly conical section over its entire length. It is also conceivable that the pipe 3 is provided with a volume connected to its outer end, and that the length of the pipe and the size of the volume are adapted to obtain the correct tuning. Preferably the cross-section area of the pipe 3 is of the same order of size as the area of the exhaust port, e.g., 0.3–3.0 times the cross-section area of the exhaust port 5. The area of the pipe 3 could thus be varied rather widely and its cross-section area has importance for how strong the returning pressure pulse will be. A very small cross-section area would give a negligible effect while the effect would increase with an increasing area up to a maximum. It is thus not an advantage to have a very large cross-section area. The pipe 3 differs in two completely determining ways from a so-called tuned pipe in a tuned exhaust system. In the tuned exhaust system there is a flow through the pipe and this pipe has a very large cross-section area to enable a powerful reflecting pressure pulse from the outer end of the pipe even though this is provided with a through-flow aperture. Obviously, the size of the through-flow aperture may not be so small that the muffler provides an unacceptably great through-flow resistance. The pipe 3 essentially has no through-flow and has considerably smaller cross-section areas than the cross section areas of a pipe in a tuned exhaust system. The design and way of function are thus very different.

It is desirable to adapt the length of the pipe 3 so that a considerable fuel saving effect is achieved at max power. This is valid particularly for a chain saw or similar tool, which during a large portion of its running time is running at max power speed. For such a high-speed engine, the pipe 3 is shorter than the pipe length for a low-speed engine. The time period between opening and closing of the exhaust port is shorter at a higher rotational speed. In such a high-speed engine the pipe 3 will be approximately 4–5 decimeters long and will have a cross-section area approximately as large as the cross-section area of the exhaust port 5. It means that the total volume in the pipe 3 is relatively limited and the pipe can therefore be rolled up, so that it requires quite a limited space, e.g., the pipe according to FIG. 1 could be rolled up to a coil around the exhaust pipe 16. This coil could also be placed inside the muffler 7, e.g., by drawing this more close to the engine's cylinder than what is shown in the figure. The coil could either be rolled up into one plane or could have a pitch, such as a thread, which is shown in the FIGS. 2 and 3. The pitch is here somewhat exaggerated for the sake of clarity. The determining fact is that the pipe is given the correct length.

The test results obtained with the invention are very interesting. Since the outflow of scavenging gases was reduced also the fuel consumption and the exhaust emission were reduced. At the same time, the output of the engine was increased. This is valid for the speed range for which the length of the pipe is tuned, e.g., the speed range of maximum power of the engine. Test runs with such an engine have thus shown that the specific fuel consumption could be reduced by approximately 10% and the engine output could be increased by approximately 10%, while the emissions of hydrocarbons were approximately halved at the same time as the emissions of nitrogen oxides were reduced considerably.

In addition, a substantial reduction of the sound level of the engine is achieved. The pipe 3 simply contributes considerably to silencing of noise of the engine. The volume in the pipe 3 serves as a buffer volume, which is advantageous for silencing. This can be used in many different ways. One way is to reduce the sound level of the engine considerably by maintaining the same muffler 7 as that of a corresponding engine without pipe 3. Another way is to reduce the volume of the muffler 7 and still achieve a sound level that at or below the sound level of a corresponding engine with a conventional muffler. An example of such a solution is shown in FIG. 3. The muffler 7 is there given a very limited volume. FIG. 2 shows the most far-reaching example where the muffler 7 is missing completely, so that the pipe 3 alone serves as a muffler device 2. It is important to note that there is essentially no flow in the pipe 3, since the outlet 6 is located far up-stream close to the exhaust port 5. It means that the pipe 3 becomes considerably cooler than the outlet 6 or the muffler 7. By winding the pipe 3 around the hotter parts it will thus protect an operator from contact with the hotter parts. For the sake of clarity, the pipe 3 is shown with very few winding turns in the FIGS. 2 and 3.

Consequently, by means of the pipe 3 the emissions of particularly unburned hydrocarbons can be reduced considerably. This preferably occurs at maximum power speed of the engine. Thereby the heat strain on a catalytic converter element 8 and on the muffler 7 into which the element is mounted will be reduced considerably. It means that a more effective conversion can be utilized without an excessively high temperature. The invention thus improves the work conditions for an exhaust catalyser. A catalytic converter element could also be placed in the pipe 3, so that it alone or in combination with at least one catalytic converter element in the outlet 6 is cleaning the exhaust emissions.

Also, due to the returning pressure pulses from the pipe 3 a stirring effect is created in the exhaust pipe 16. This is valuable for all two-stroke engines but particularly advantageous if the engine 1 is of so called air-head type. In such an engine, the scavenging duct 14 is filled with fresh air, which is scavenged into the combustion chamber and which forces the exhaust gases ahead, out through the exhaust port. As such, into the exhaust pipe 16 will come: first exhaust gases, then air, and thereafter air/fuel mixture that is lost out through the exhaust port. The invention could thus, on the one hand reduce the loss of air/fuel mixture out through the exhaust port, but also on the other hand create a more even distribution of the air/fuel mixture and the air in the exhaust gases in the muffler, so that a following catalyser could function better.

Furthermore, the pipe cools the exhaust gases somewhat. As such, the exhaust mixture becomes cooler. This is particularly advantageous in connection with an air-head-engine, since both the demand for exhaust homogenisation as well as cooler and leaner exhaust gases are greater for such an engine than for a conventional two-stroke engine. This is in due part to the increased surplus of oxygen in the exhaust gases leading to an increased risk of after-oxidation in the muffler for such an engine than for a conventional two-stroke engine. The risk is particularly great if a catalyser is used for the whole or a part of the exhaust flow in the muffler. An after-oxidation in the muffler leads to a condition in which all combustible exhaust components will be oxidized so that an unacceptable heat generation takes place.

As mentioned above the pipe 3 can be tuned for a suitable rotational speed of the engine, usually the maximum power speed of the engine. However, in combination with an air-head-engine it could also be interesting to tune for a lower rotational speed. For, the purpose of the air-head system as such is to reduce the engine's emissions and its tuning is preferably carried out so that the engine's emissions will be reduced especially much at the maximum power speed of the engine. A tuning in order to achieve maximum reduction of the emissions at a considerably lower rotational speed would lead to deterioration of the engine performance. In this regard the pipe is more flexible and in combination with air-head it could then be tuned against a lower rotational speed than the engine's maximum power rotational speed. This means that the engine will get a considerably reduced level of emissions at this lower rotational speed. For example, the emissions could be more than halved at a speed of 100 rotations per second by the aid of a pipe that is tuned for this engine speed in an air-head-engine with a maximum power speed of approximately 160 rps. At the higher rotational speed the pipe will have a very small effect on the emission degree, perhaps even a negative effect, since its pressure pulse will occur too late, but at the lower rotational speed it will thus have a significant effect. Accordingly, hereby the engine's characteristics within a wider range of rotational speeds will be improved in that the air-head technology gives an improvement that is greatest at the higher rotational speed while the pipe will improve it further at the lower speed. Obviously, both techniques will provide improvements also beside the tuned rotational speed, but to a decreasing degree. In this way the engine could thus cover a wider speed range regarding exhaust emissions.

However, it would also be possible to utilize this effect from a kind of co-ordinating point of view. A chainsaw engine of air-head type, e.g., tuned for the higher speed 160 rps, could be provided with a pipe tuned, e.g., for 100 rps for use as a blower engine running at a very constant lower rotational speed. Hereby a very low degree of exhaust emissions can be achieved at this lower rotational speed even though the engine in other respects is not fully tuned for it. Preferably the length of the pipe in this case is tuned for a rotational speed that is essentially lower than the maximum power speed of the engine, e.g., 50–90% of this, and preferably 55–75% of this.

It must be pointed out that in most portable working tools it is extremely difficult or almost impossible to get space for a perhaps 40–70 cm long pipe. In particular, it seems most easy in a blower.

What is claimed:

1. A two-stroke internal combustion engine including an exhaust port for exit of combustion gases from the engine, an outlet from the exhaust port to the atmosphere external to the engine, and a closed-end pipe connected to the exhaust port, wherein a minimum cross-section area of the outlet is smaller than a minimum cross-section area of the pipe, and the outlet being dimensioned to provide a path of travel for exhaust gases from the exhaust port to the external atmosphere that is less than an overall internal length of the pipe, wherein the outlet includes a muffler.

2. A two-stroke internal combustion engine including an exhaust port for exit of combustion gases from the engine, a muffler device operatively connected to the exhaust port, and a closed-end pipe operatively connected to the exhaust port, wherein the muffler device provides an outlet to the atmosphere external to the engine, a minimum cross-sectional area of the outlet is smaller than a minimum cross-section area of the pipe, and the muffler device being dimensioned to provide a path of travel for exhaust gases through the muffler device that is less than an overall internal length of the pipe.

3. An internal combustion engine according to claim 2, wherein the length of the path of travel for exhaust gases from the exhaust port to the external atmosphere along the muffler device is less than half the internal length of the pipe.

4. An internal combustion engine according to claim 2, wherein the muffler device includes a muffler.

5. An internal combustion engine according to claim 2, wherein the pipe is arranged in the form of a coil.

6. An internal combustion engine according to claim 2, wherein the muffler device includes a catalytic converter element.

7. An internal combustion engine according to claim 2, wherein the pipe has an essentially constant cross-section area along an entire length of the pipe.

8. An internal combustion engine according to claim 7, wherein the cross-section area of the pipe is of the same order of size as a cross-section area of the exhaust port.

9. An internal combustion engine according to claim 2, wherein the engine is of an air-head type.

10. An internal combustion engine according to claim 9, characterized in that the length of the pipe is tuned for an engine speed that is lower than a maximum speed of the engine.

* * * * *

UNITED STATES PATENT AND TRADEMARK OFFICE
CERTIFICATE OF CORRECTION

PATENT NO. : 6,698,194 B2
DATED : March 2, 2004
INVENTOR(S) : Gordon P. Blair and Reine Gustafsson It is certified that error appears in the above-identified patent and that said Letters Patent is hereby corrected as shown below:

<u>Title page,</u>
Item [75], Inventors, please delete "Belfast (CH)", and insert therefor -- Belfast (IE) --.
Item [30], Foreign Application Priority Data, insert the followng:

-- [30]     Foreign Application Priority Data

September 22, 1999        (SE)…………….....9903403-5 --

Signed and Sealed this

Thirty-first Day of August, 2004

JON W. DUDAS
*Director of the United States Patent and Trademark Office*